US005887327A

United States Patent [19]

Erickson

[11] Patent Number: 5,887,327

[45] Date of Patent: Mar. 30, 1999

[54] TIRE CROSS CHAIN APPLICATION AND REMOVAL TOOL

[76] Inventor: Randall O. Erickson, P.O. Box 648, Kodiak, Ak. 99615

[21] Appl. No.: 748,352

[22] Filed: Nov. 14, 1996

[51] Int. Cl.[6] .......... B23P 19/04

[52] U.S. Cl. .......... 29/252; 81/301; 7/125

[58] Field of Search .......... 29/252, 262, 265, 29/268, 270; 269/237, 238; 254/18

[56] References Cited

U.S. PATENT DOCUMENTS

| | | | |
|---|---|---|---|
| 3,550,243 | 12/1970 | Allsop | 29/252 |
| 3,575,405 | 4/1971 | Harding | 269/270 |
| 3,673,662 | 7/1972 | Turnbull | 29/252 |
| 3,983,947 | 10/1976 | Willis et al. | 173/169 |
| 4,131,009 | 12/1978 | Hara et al. | 29/252 |
| 4,261,090 | 4/1981 | DeBoer | 29/252 |
| 4,494,739 | 1/1985 | Valentine | 269/237 |

*Primary Examiner*—David A. Scherbel
*Assistant Examiner*—Lee Wilson
*Attorney, Agent, or Firm*—Craig M. Korfanta

[57] ABSTRACT

An improved pneumatic tool for the removal and application of tire cross chains configured having a manually actuated valve connected at its inlet port to a compressed air source and at its outlet port to a pneumatic diaphragm motor for actuation of a diaphragm. The control valve includes an air bleed port which allows air to escape through the valve when the trigger or other operating mechanism is released deactivating the valve. This feature allows an almost immediate recovery of the jaws to the open position. The pneumatic tool for the removal and application of tire cross chains also includes a fixed jaw support assembly having a base plate for attachment to the face of the pneumatic diaphragm motor, the fixed jaw support assembly having a pair of upright members attached to the base plate and extending perpendicularly and in spaced apart relationship to one another to accommodate the attachment of the fixed and the moveable jaws between the two upright members thereto. This feature eliminates torque between the jaw assemblies and the pneumatic diaphragm motor when pressure is applied to the jaws.

2 Claims, 4 Drawing Sheets

TIRE CROSS CHAIN APPLICATION AND REMOVAL TOOL

BACKGROUND OF THE INVENTION

1. Technical Field

This invention applies generally to the field of pneumatically operated tools and more specifically to pneumatically operated tool for removal and application tire chain cross chain links.

2. Background of the Invention

Tire chains, used by a variety of vehicles including large over the road freight trucks and tractors, and other assorted vehicles and equipment often times use tire chains to increase traction. A tire chain is made up of a pair of side chain assemblies which are connected by cross chains. One side chain assembly is fitted facing each of the tire inner wall and the tire outer wall. The cross chains lay across the tread of the tire and are attached at either of its two ends to the side chain assemblies and therefore come in contact with the road or other surface as the tire rotates thereby increasing the vehicle's traction. Since the cross chains are the component of the tire chain which comes in contact with the ground or other road surface, they are the most likely to fail. Therefore, a means for removal and reapplication of cross chains is needed.

More often than not, cross chains fail during use and often times, the vehicle employing the tire chains is at a location distant from the availability of repair services. Therefor, the tool or other apparatus for removal and application of tire cross chains had to be readily deployable at such locations. Because a substantial amount of force is required to open the hooks on the tire cross chains for removal and a similar force or pressure is required to close the hooks on the new chains, a source of power is required to provide such pressure.

De Boer, U. S. Pat. No. 4,261,090 discloses a tire cross chain applying and removing apparatus having a pneumatic diaphragm motor which operates two pairs of fixed and moveable jaws for opening the hooks on tire cross chains for removal from the side chains and for closing the hooks on new cross chains for applying to the side chains. Power for the tool is provided by pneumatic pressure from a vehicle air pressure system. The De Boer apparatus comprises a stand for supporting the pneumatic diaphragm motor having a shank fixed on the stand. The stand has a pair of movable jaw members pivotally mounted thereto. The jaws are operated by a reciprocal rod pivotally connected to the pair of moveable jaws, the reciprocal rod being actuated by the pneumatic diaphragm motor. The De Boer invention resides in a pair of double jaws actuated by a pneumatic diaphragm motor, one pair of jaws being formed to fit within a hook of a cross chain to open the hook, the other pair of jaws forming clamping jaws to close a hook on the new cross chain. The jaws are mounted on the support which carries a pneumatic diaphragm motor for actuating the jaws. Connection to a vehicle air pressure system enables the apparatus to be operated at remote locations. The De Boer apparatus includes a manually operated valve which is connected to an air line which extends through the tool's handle to the pneumatic diaphragm motor.

The manually operated valve of the De Boer apparatus is a single action valve which allows air pressure through the valve to the pneumatic diaphragm motor upon operation of the valves actuator button. Upon release of the button, air pressure is bled back through the air line resulting in a extremely slow release or recovery of the jaws to an open position.

What is needed is a tool for removing tire cross chains for connection to a pneumatic power source having a manually operated valve or regulator which directs air to the first side of the pneumatic diaphragm motor for actuating the jaws in a first direction causing the jaws to close and which, when the manually operated valve or regulator is released deactivating the valve, allows the air against the diaphragm to bleed back through the valve to a bleed port allowing a much faster recovery of the jaws for opening. There exist advantages to such a design both in terms of basic functionality as well as from a safety standpoint.

The De Boer apparatus is also constructed having the single extended shank which extends from the support for the pneumatic diaphragm motor, for attachment of the pair of moveable jaws. Because of the force and torque generated by the tool in operation, the extended shank has a tendency to twist against the stand and the pneumatic diaphragm motor. What is needed is a more substantial jaw assembly which eliminates the propensity of the fixed jaw to torque at the connection to the pneumatic diaphragm motor.

SUMMARY OF THE INVENTION

According to the present invention these and other objects are achieved by an improved tool for the removal and application of tire cross chains configured having a manually actuated valve connected at its inlet port to a compressed air source and at its outlet port to a pneumatic diaphragm motor for actuation of a diaphragm. The valve includes an air bleed port which allows air to escape through the valve when the trigger or other operating means is released deactivating the valve. This feature allows an almost immediate recovery of the jaws as the air pressure is bled to atmosphere as opposed to the tool disclosed in the prior art wherein the air pressure against the diaphragm of the pneumatic motor bleeds back through the air hose connected to the compressed air source having to overcome the pressure of the system in order to open the tools' jaws.

The invention also includes a fixed jaw support assembly having a base plate for attachment to the face of the pneumatic diaphragm motor, the fixed jaw support assembly also having a pair of upright members attached to the base plate and extending perpendicularly therefrom in spaced apart relationship to one another configured to accommodate the placement of the fixed jaw between the two upright members for attachment thereto. This feature eliminates the tendency of the fixed jaw to torque or deflect against the pneumatic diaphragm motor when pressure is applied to the jaws.

Additional objects advantages and novel features of the invention will be set forth in part of the description that follows and in part will become apparent to those skilled in the art upon examination of the following or may be learned by practice of the invention. The objects and advantages of the invention may be realized and attained by means of the instrumentalities and combinations particularly pointed out in the appendant claims.

DETAILED DESCRIPTION OF THE INVENTION

Figure 1:
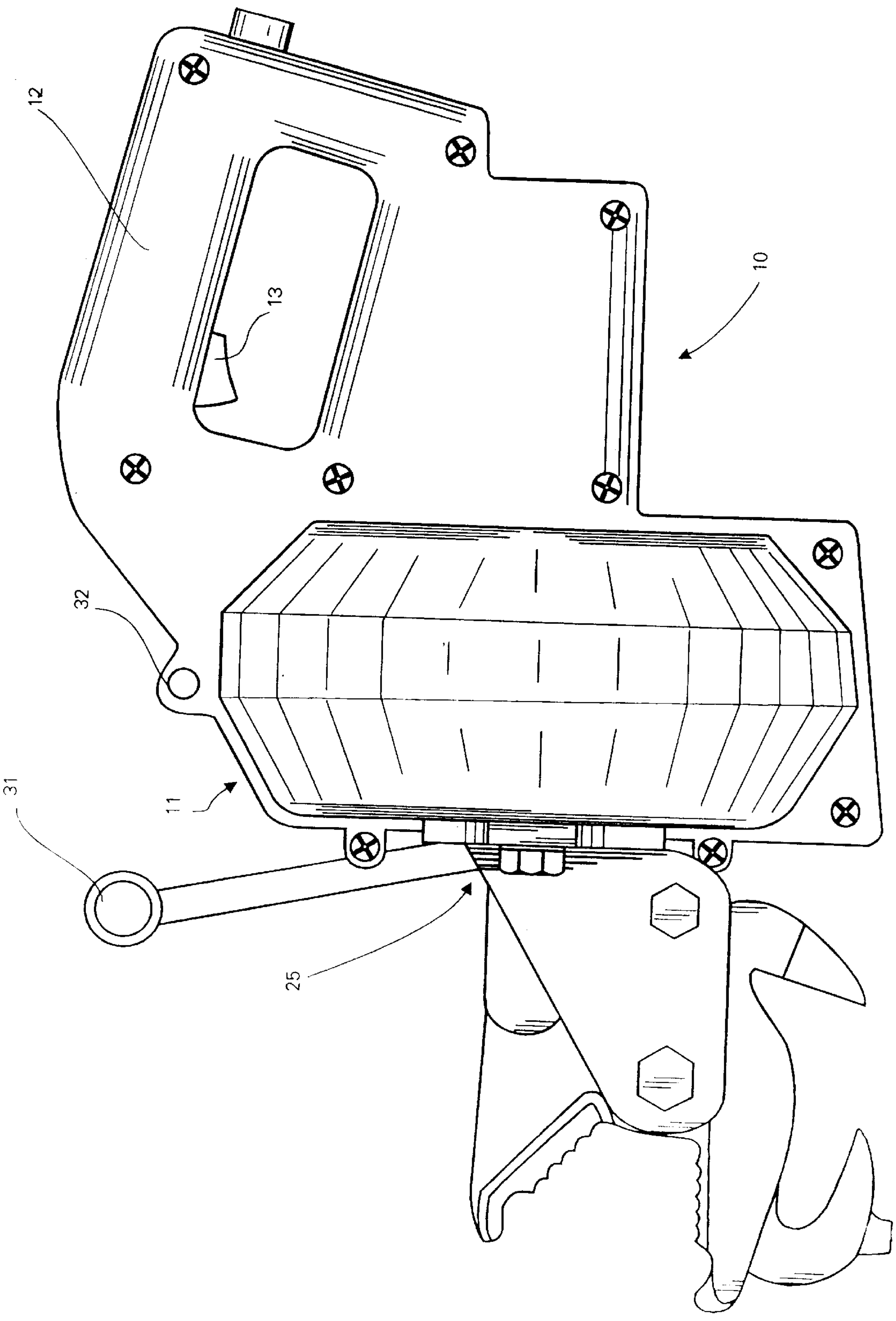
FIG. 1 is a side view of one embodiment of a tire cross chain application and removal tool according to the invention.
Figure 2:
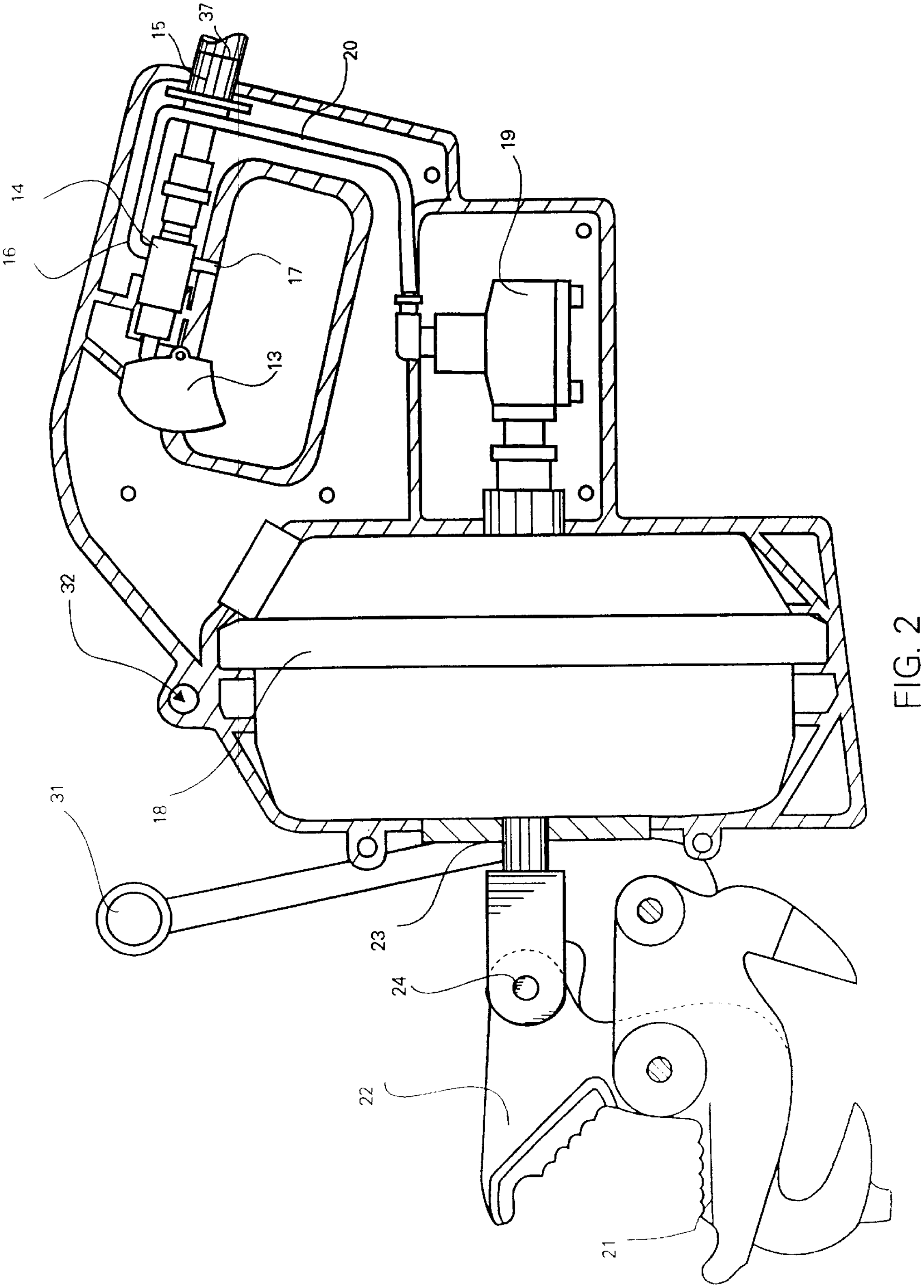
FIG. 2 is a cross sectional side view of one embodiment of a tire cross chain application and removal tool according to the invention.

Referring now to the Figures, the improved tire cross chain application and removal tool will be more fully described and understood. Cross chain application and removal tool 10 employs housing 11 to contain and support the various components of the invention. Housing 11 is constructed having handle 12 which is positioned to allow the operator to manually operate the tool. Trigger 13 is pivotally attached within housing 1 1 projecting below the underside of handle 13 although other configurations are possible.

Control valve 14 is manually actuated when trigger 13 is depressed. Control valve 14 includes control valve inlet port 15 which, in operation is pneumatically connected to and in fluid communication with to a compressed air source A. Control valve 14 also includes control valve outlet port 16 which is pneumatically connected to and in fluid communication with pneumatic diaphragm motor 18 via air line 20. In the preferred embodiment of the invention, bellows 19 is deployed in-line between pneumatic diaphragm motor 18 and control valve outlet port 16. Finally, control valve 14 also includes control valve bleed port 17.

Cross chain application and removal tool 10 also includes jaw support assembly 25 having jaw support base plate 26 removably attached to the face of housing 11, via bolts 35 and 36, and the face of pneumatic diaphragm motor 18. Attached to jaw support base plate 26 and extending perpendicularly from the face of jaw support base plate 26 are jaw support first upright member 27 and jaw support second upright member 28. Jaw support first upright member 27 and jaw support second upright member 28 are attached in spaced apart relationship to one another, configured to allow the removable attachment of fixed jaw assembly 21 and the relatively pivotal attachment of movable jaw assembly 22 between jaw support first upright member 27 and jaw support second upright member 28.

Fixed jaw assembly 21 is removably attached to jaw support first upright member 27 at jaw assembly lug 29 and at by screw 30 which passes through jaw support second upright member 28 engaging threaded hole 39 of fixed jaw assembly 21. Movable jaw assembly 22 is pivotally attached to jaw support first upright member 27 at jaw assembly lug 29. Shank 23 is pivotally attached to movable jaw assembly 22 by pin 24. The second end of shank 23 is operatively connected to pneumatic diaphragm motor 18 allowing movable jaw assembly 22 to pivot relative to fixed jaw assembly 21. The relative length of shank 23 projecting from the face of pneumatic diaphragm motor 18 may be adjusted at nut 30, allowing the gap or spacing between fixed jaw assembly 21 and movable jaw assembly 22 to be varied.

Fixed jaw assembly 21 includes opening jaw 31 and clamping jaw 33. Similarly, movable jaw assembly 22 includes opening jaw 32 and clamping jaw 34.

Figure 3:
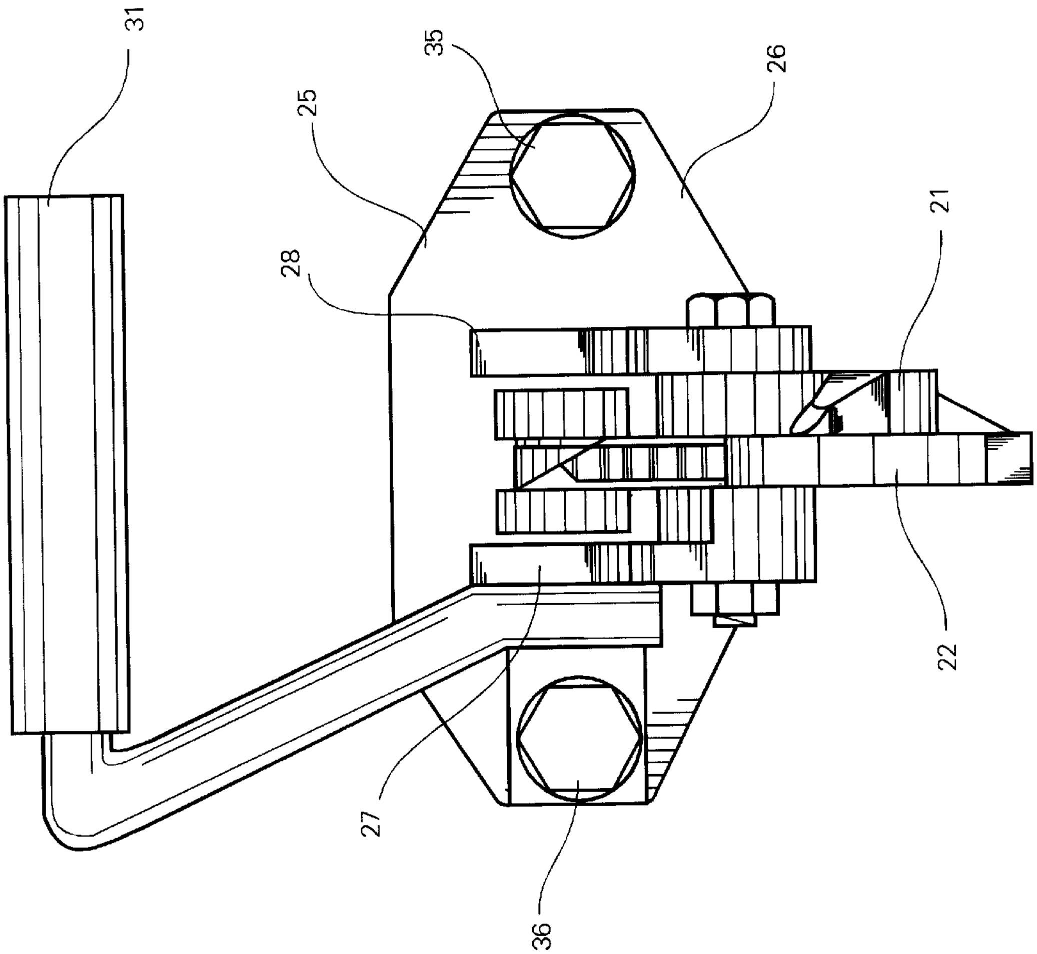
FIG. 3 is a front view of one embodiment of a jaw assembly according to the invention.

In operation, air hose 37 supplies pressurized to control valve 14 at control valve inlet port 15. To remove a cross chain, opening jaws 31 and 32 engage in the hooks of the cross chain to open the hooks, opening jaws 31 and 32 being pointed with their ends overlapping as shown at FIG. 3. An old or damaged cross chain may now be removed by depressing trigger 13 which allows air to pass through control valve 14 exiting control valve outlet port 16, passing through air line 20 through bellows 19 to pneumatic diaphragm motor 18. Air pressure operates against the diaphragm of pneumatic diaphragm motor 18 extending shank 23, thereby closing opening jaws 31 and 32 and opening the hooks of the cross chain. When the manual pressure exerted against trigger 13 by the tool operator is released air pressure against the diaphragm of pneumatic diaphragm motor 18 bleeds back through bellows 19 through air line 20 to control valve 14 bleeding off through control valve bleed port 17.

Figure 4:
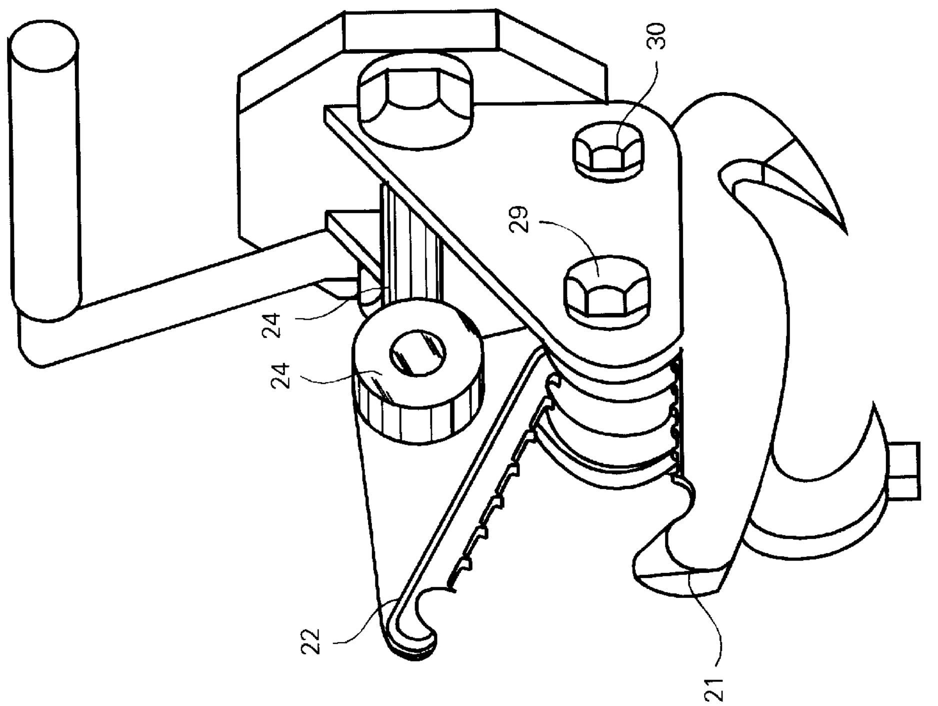
FIG. 4 is an isometric view of one embodiment of a jaw assembly according to the invention.

To replace the cross chain, the open hooks of the new links are engaged in the side chain assemblies of the tire chain. The open hooks of the new links are then placed in clamping jaws 33 and 34 as shown in FIG. 4 and are closed by depressing trigger 13 which allows air to pass through control valve 14 exiting control valve outlet port 16, passing through air line 20 through bellows 19 to pneumatic diaphragm motor 18. Air pressure operates against the diaphragm of pneumatic diaphragm motor 18 extending shank 23, thereby closing clamping jaws 33 and 34 and closing the hooks of the cross chain.

While there is shown and described the preferred embodiment of the invention, it is to be distinctly understood that this invention is not limited thereto but may be variously embodied to practice within the scope of the following claims.

I claim:

1. A pneumatic tool for applying and removing cross chains of tire chains comprising:

a housing;

a control valve mounted within the housing, the control valve having a control valve inlet port pneumatically connectable to a compressed air source, a control valve outlet port and a control valve bleed port;

a pneumatic diaphragm motor mounted within the housing and pneumatically connected to and in fluid communication with the control valve outlet port;

a fixed jaw assembly including a jaw support base plate removably attached to the housing and fixed with respect to the housing and first and second jaw support upright members attached to and extending perpendicularly from the jaw support base plate in spaced apart relationship to one another;

a movable jaw assembly pivotally attached between the first and second law support upright members; and a shank pivotally attached a first end to the movable jaw assembly and operatively attached at a second end to the pneumatic diaphragm motor.

2. The pneumatic tool for applying and removing cross chains of tire chains of claim 1 wherein the shank further comprises means for adjusting the relative length of the shank projecting from the pneumatic diaphragm motor for adjusting a relative distance between the fixed jaw assembly and the movable jaw assembly.

* * * * *